(12) United States Patent
Hane

(10) Patent No.: US 12,172,322 B2
(45) Date of Patent: Dec. 24, 2024

(54) ROBOT SIMULATION DEVICE

(71) Applicant: Fanuc Corporation, Yamanashi (JP)

(72) Inventor: Mikito Hane, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 275 days.

(21) Appl. No.: 17/791,301

(22) PCT Filed: Jan. 13, 2021

(86) PCT No.: PCT/JP2021/000895
§ 371 (c)(1),
(2) Date: Jul. 7, 2022

(87) PCT Pub. No.: WO2021/149563
PCT Pub. Date: Jul. 29, 2021

(65) Prior Publication Data
US 2023/0032334 A1    Feb. 2, 2023

(30) Foreign Application Priority Data

Jan. 20, 2020   (JP) ................................. 2020-006855

(51) Int. Cl.
*B25J 9/16*          (2006.01)
(52) U.S. Cl.
CPC .................. *B25J 9/1671* (2013.01)
(58) Field of Classification Search
CPC ........ B25J 9/1671; B25J 9/161; B25J 9/1633; G05B 2219/40032; G05B 2219/40087; G05B 2219/40122

(Continued)

(56) References Cited

U.S. PATENT DOCUMENTS 5,825,308 A  *  10/1998  Rosenberg ............ G06F 3/0395
                                                      341/20
6,061,004 A  *   5/2000  Rosenberg .............. G06F 3/016
                                                      341/20
(Continued)

FOREIGN PATENT DOCUMENTS

JP           06262563 A       9/1994
JP        2002355782 A       12/2002
(Continued)

OTHER PUBLICATIONS

International Search Report and Written Opinion for International Application No. PCT/JP2021/000895, dated Apr. 6, 2021, 7 pages.

*Primary Examiner* — Jaime Figueroa
(74) *Attorney, Agent, or Firm* — Buchanan Ingersoll & Rooney PC

(57) ABSTRACT

There is provided a robot simulation part device which can facilitate the setting of parameters of force control. A robot simulation device for simulating a force control operation which is performed while bringing a tool part mounted on a robot manipulator into contact with a target workpiece includes a memory which stores a motion program and a force control parameter, which is a set parameter related to the force control operation, and a force control simulation execution part which executes a simulation of the force control operation based on the motion program and the force control parameter, wherein the force control simulation execution part has a virtual force generation part configured to generate, based on position information of the tool part obtained from results of the simulation of the force control operation, a virtual force received by the tool part from the target workpiece in a state in which the tool part is in contact with the target workpiece, and executes the simulation of the (Continued)

force control operation based on the virtual force and a target force set as the force control parameter.

8 Claims, 14 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 7,847,503 | B2* | 12/2010 | Ooga | G05B 19/4086 |
| | | | | 318/568.2 |
| 7,881,917 | B2* | 2/2011 | Nagatsuka | G05B 19/4069 |
| | | | | 703/7 |
| 8,185,265 | B2* | 5/2012 | Nagano | B25J 9/1666 |
| | | | | 701/25 |
| 9,272,417 | B2* | 3/2016 | Konolige | B25J 15/0616 |
| 9,579,797 | B2* | 2/2017 | Apkarian | B25J 9/1689 |
| 9,597,797 | B2* | 3/2017 | Ponulak | G05D 1/0088 |
| 9,696,795 | B2* | 7/2017 | Marcolina | G06T 17/10 |
| 10,354,397 | B2* | 7/2019 | Davis | G06T 7/251 |
| 10,576,635 | B2* | 3/2020 | Ogawa | B25J 19/023 |
| 10,800,033 | B2* | 10/2020 | Yamada | B25J 9/1697 |
| 11,045,958 | B2* | 6/2021 | Bowling | B25J 9/161 |
| 11,097,418 | B2* | 8/2021 | Nagarajan | B25J 9/1612 |
| 11,173,610 | B2* | 11/2021 | Gothoskar | B25J 9/163 |
| 11,220,002 | B2* | 1/2022 | Atohira | B25J 9/1605 |
| 11,396,101 | B2* | 7/2022 | Sugiyama | B25J 9/163 |
| 11,639,001 | B2* | 5/2023 | Bowling | A61B 34/10 |
| | | | | 700/254 |
| 11,707,837 | B2* | 7/2023 | Oleynik | G05B 19/42 |
| | | | | 700/250 |
| 11,787,037 | B2* | 10/2023 | Sakaino | B25J 3/00 |
| | | | | 700/253 |
| 2005/0024331 | A1* | 2/2005 | Berkley | A61B 34/71 |
| | | | | 345/157 |
| 2006/0152533 | A1* | 7/2006 | Read | B25J 9/1671 |
| | | | | 345/653 |
| 2007/0282485 | A1* | 12/2007 | Nagatsuka | G05B 19/4069 |
| | | | | 700/245 |
| 2010/0168950 | A1* | 7/2010 | Nagano | B25J 9/1666 |
| | | | | 701/25 |
| 2015/0379171 | A1* | 12/2015 | Kuwahara | G06F 30/20 |
| | | | | 703/13 |
| 2016/0239080 | A1* | 8/2016 | Marcolina | G06T 17/10 |
| 2016/0257000 | A1* | 9/2016 | Guerin | B25J 9/1671 |
| 2016/0332297 | A1* | 11/2016 | Sugaya | B25J 9/1671 |
| 2018/0029232 | A1* | 2/2018 | Ouchi | B25J 9/1671 |
| 2018/0231965 | A1* | 8/2018 | Onoyama | G05B 19/423 |
| 2018/0297202 | A1* | 10/2018 | Nishitani | G06F 30/20 |
| 2019/0221037 | A1* | 7/2019 | Sugaya | G06T 13/20 |
| 2019/0329405 | A1* | 10/2019 | Atohira | G06T 17/00 |
| 2022/0168047 | A1* | 6/2022 | Nagao | A61B 1/0016 |

FOREIGN PATENT DOCUMENTS

| | | |
|---|---|---|
| JP | 2011224696 A | 11/2011 |
| JP | 2014128857 A | 7/2014 |
| JP | 2018015857 A | 2/2018 |
| JP | 2019063879 A | 4/2019 |
| JP | 2019081242 A | 5/2019 |
| JP | 2019188530 A | 10/2019 |

* cited by examiner

ROBOT SIMULATION DEVICE

CROSS REFERENCE TO RELATED APPLICATIONS

This is the U.S. National Phase application of PCT/JP2021/000895, filed Jan. 13, 2021, which claims priority to Japanese Patent Application No. 2020-006855, filed Jan. 20, 2020, the disclosures of these applications being incorporated herein by reference in their entireties for all purposes.

FIELD OF THE INVENTION

The present invention relates to a robot simulation device for simulating the operation of a robot.

BACKGROUND OF THE INVENTION

Various simulation devices for simulating the operation of an industrial robot have been provided. For example, Patent Literature 1 describes "a simulation device which performs simulation by means of a virtual robot, which is a virtualized robot, the simulation device comprising a reception part which receives commands for instructing at least one of holding and releasing of a virtual object by a virtual holding part of the virtual robot, and a control part which performs at least one of holding and releasing of the virtual object by the virtual holding part based on a command received by the reception part" (Patent Literature 1, claim 1).

PATENT LITERATURE

[PTL 1] Japanese Unexamined Patent Publication (Kokai) No. 2019-63879

SUMMARY OF THE INVENTION

By equipping a robot manipulator with a force sensor, it is possible to detect forces applied to a workpiece and perform advanced operations such as exploration operations, fitting operations, and polishing while performing force control. However, skilled parameter adjustment ability is required to properly perform force control. In general, in order to perform such parameter adjustment, it is necessary for an operator to repeatedly fail and succeed in force control to acquire parameter setting know-how. A robot simulation device which can facilitate parameter setting of force control is desired.

One aspect of the present disclosure provides a robot simulation device for simulating a force control operation which is performed while bringing a tool part mounted on a robot manipulator into contact with a target workpiece, the device comprising a memory which stores a motion program and a force control parameter, which is a set parameter related to the force control operation, and a force control simulation execution part configured to execute a simulation of the force control operation based on the motion program and the force control parameter, wherein the force control simulation execution part comprises a virtual force generation part configured to generate, based on position information of the tool part obtained from results of the simulation of the force control operation, a virtual force received by the tool part from the target workpiece in a state in which the tool part is in contact with the target workpiece, and execute the simulation of the force control operation based on the virtual force and a target force set as the force control parameter.

According to the above configuration, an operator can intuitively understand the generation state of a pressing force, and can easily carry out force control parameter setting.

From the detailed description of typical embodiments of the invention shown in the attached drawings, the objective, features, and advantages of the invention as well as other objectives, features, and advantages will be further clarified.

DETAILED DESCRIPTION OF EMBODIMENTS OF THE INVENTION

Figure 1:
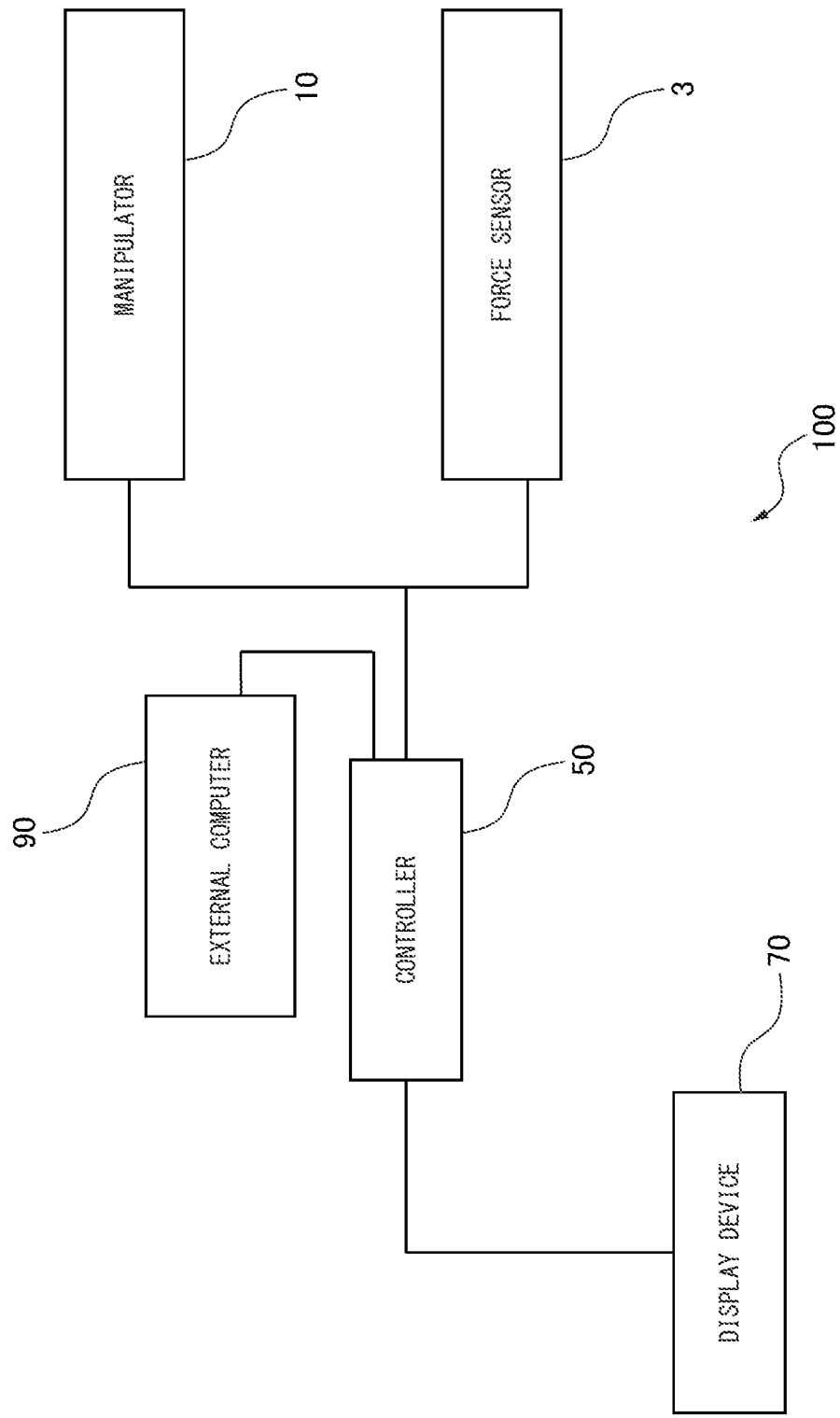
FIG. 1 is a system configuration view of a robot system including a controller as a simulation device according to an embodiment.

Next, the embodiments of the present disclosure will be described with reference to the drawings. In the referenced drawings, identical constituent portions or functional portions have been assigned the same reference sign. In order to facilitate understanding, the scales of the drawings have been appropriately modified. Furthermore, the forms shown in the drawings are merely one example for carrying out the present invention. The present invention is not limited to the illustrated forms.

FIG. 1 is a system configuration view of a robot system 100 comprising a controller 50 as a robot simulation device according to an embodiment. As shown in FIG. 1, a robot manipulator 10 (hereinafter described as manipulator 10) having a tool mounted on a wrist tip thereof, and a force sensor 3 as a force detector for detecting external forces applied to the tool are connected to the controller 50. The force sensor 3 is attached between the tip of the wrist of the manipulator 10 and the tool. Alternatively, the force sensor 3 may be installed on the workpiece. By providing a force control function, the controller 50 can cause the manipulator 10 to perform various operations such as exploration operations, precision fitting operations, and polishing (profiling operation), which are advanced operations, while detecting the forces applied to the workpiece. The controller 50 may have a configuration as a general computer having a CPU, ROM, RAM, storage device, operation unit, display unit, input/output interface, network interface, etc.

Further, an external computer 90 which is responsible for functions for executing a physics simulation based on an operation model of the manipulator 10 when the controller 50 executes a simulation of the force control operation (hereinafter referred to as force control simulation), and a display device 70 on which force control simulation results are displayed are connected to the controller 50. Note that as used herein, the term "simulation" encompasses not only operations of calculating the position of the manipulator or the like by numerical simulation, but also the case in which a shape model of the manipulator or the like is simulated in accordance with teaching data or the like.

Figure 2:
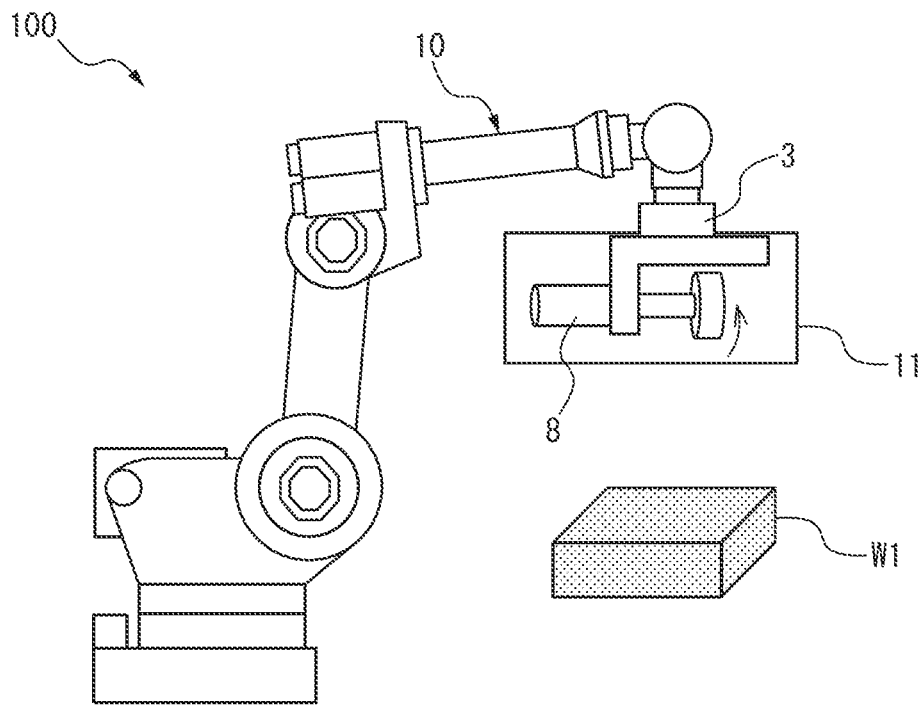
FIG. 2 shows a structural example of a robot system.
Figure 3:
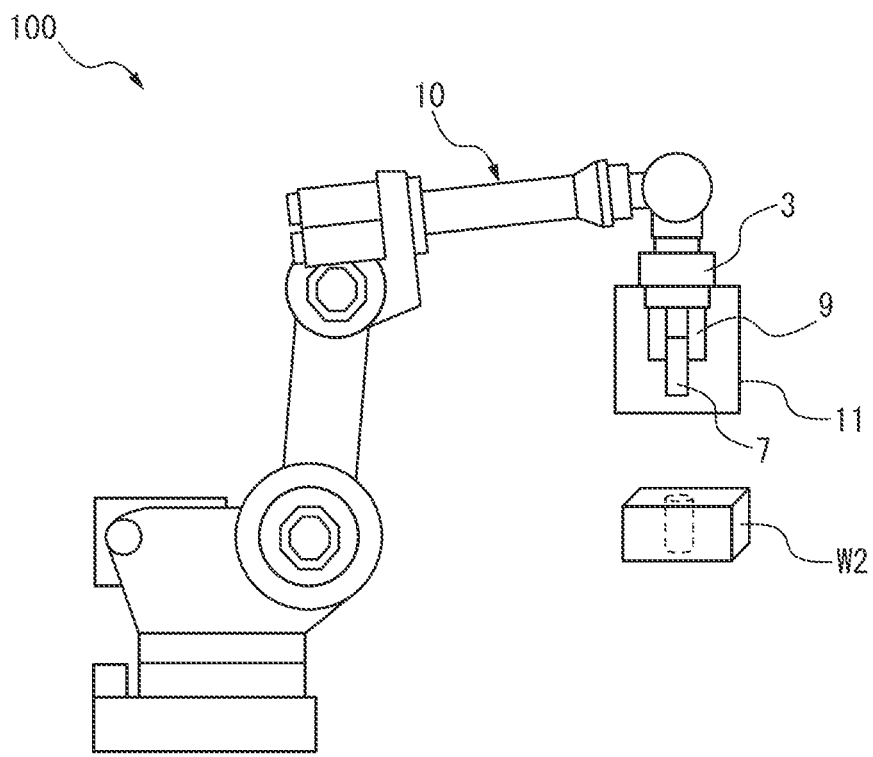
FIG. 3 shows another structure example of a robot system.

FIGS. 2 and 3 show structural examples of the robot system 100. Furthermore, in FIGS. 2 and 3, only the manipulator 10 (including the force sensor 3 and the tool part 11) and the target workpiece are shown. FIG. 2 shows a configuration example in which a grinder 8 for executing a polishing operation on a workpiece W1 is mounted on a tool part 11. In the case of such a configuration example, the controller 50 executes a polishing operation on the target workpiece by force control.

FIG. 3 shows a configuration example in which a hand 9 for executing a fitting operation on a workpiece W2 is mounted on the tool part 11. In FIG. 3, the hand 9 for gripping a workpiece 7 such as a cylinder is mounted on the tool part 11. In the configuration example of FIG. 3, the controller 50 executes the operation of fitting the workpiece 7 gripped by the hand 9 into a hole formed in the target workpiece W2 by force control.

The controller 50 further has functions for visualizing the magnitude of the force (specifically, the pressing force acting on the target workpiece) received by the tool part 11 from the target workpiece and the occurrence site thereof by executing a force control simulation in accordance with teaching data (motion program) and the force control parameter according to the operator, and displaying the magnitude of the force and the occurrence site on the display device 70 as an AR (augmented reality) image or VR (virtual reality) image. As a result, for example, the operator can understand how much the pressing force will be and where it will act on the target workpiece, and can adjust the motion program and force control parameters before actually executing the force control operation. Note that in the present description, the force control parameter includes at least one of a target pressing force, pressing direction velocity, force control gain, search area, velocity gain, and teaching position.

Figure 4:
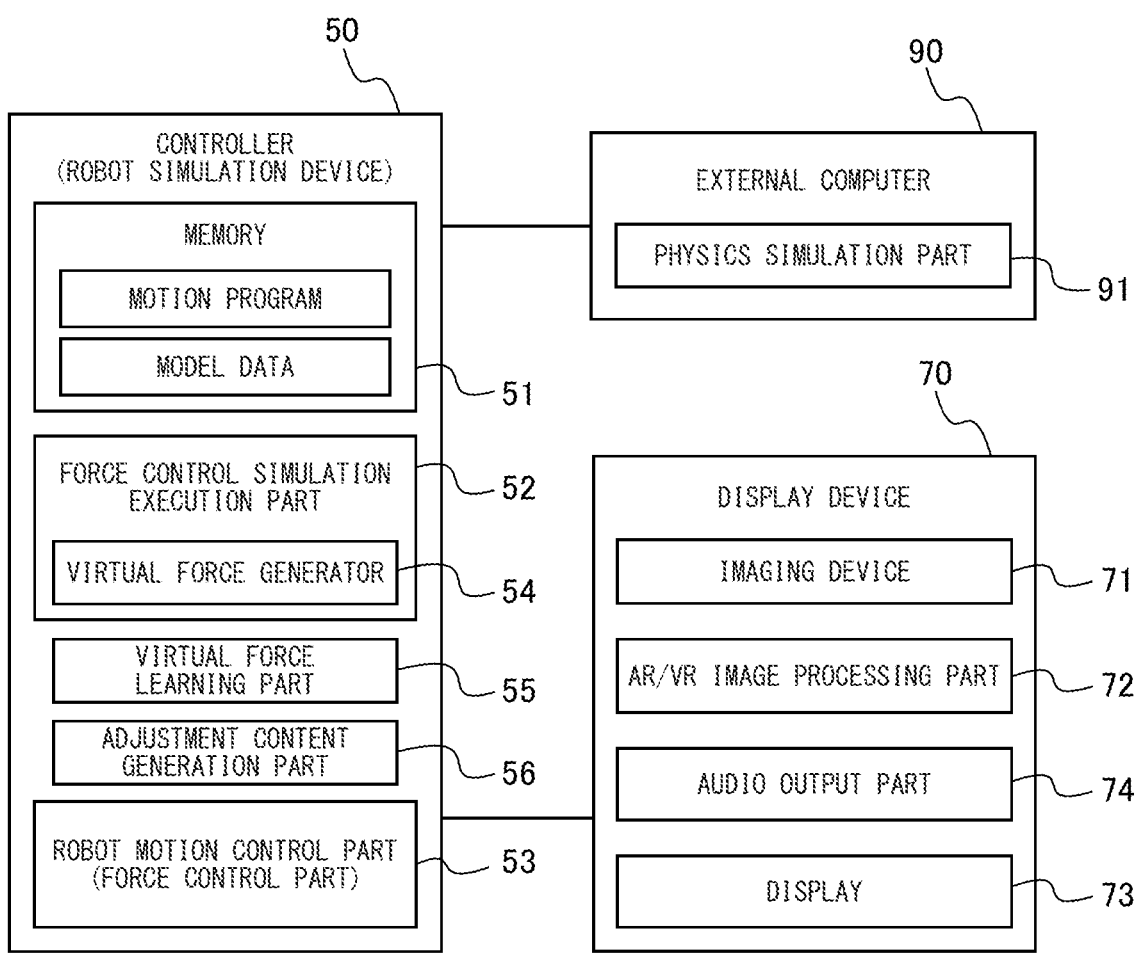
FIG. 4 is a functional block diagram of a controller, external computer, and display device.

FIG. 4 is a functional block diagram of the controller 50, the external computer 90, and the display device 70. As shown in FIG. 4, the controller 50 comprises a memory 51 in which various information is stored, a force control simulation execution part 52 which controls the execution of force control simulation, a robot motion control part 53 which controls the operation of the robot manipulator 10, a virtual force generator (virtual force generation part) 54, a virtual force learning part 55, and an adjustment content generation part 56. The motion program of the manipulator 10, 3D model data of the manipulator 10, tools, workpieces, etc., force control parameters, and other various data used to control the manipulator 10 are stored in the memory 51. The virtual force generator 54 generates a virtual force which is received by the tool part 11 from the target workpiece in a state in which the tool part 11 is in contact with the target workpiece based on the position information of the tool part 11 obtained from the force control simulation results. In the present description, the force virtually obtained as a force acting on an object in this manner be described as a virtual force, and when it is a pressing force, it may also be described as a virtual pressing force.

The external computer 90 comprises a physics simulation part 91 which executes a physics simulation of the manipulator 10 based on a motion model (equation of motion) of the manipulator 10.

In the present embodiment, the display device 70 is configured as a head-mounted display. The display device 70 can also be constituted by another information processing device such as a tablet terminal on which a camera is mounted. The operator wears the display device 70 configured as a head-mounted display. The display device 70 includes an imaging device 71, an AR/VR image processing part 72 which executes image processing for displaying an augmented reality (AR) image or a virtual reality (VR) image, a display 73, and an audio output part 74. The imaging device 71 is provided on the display device 70 so that the optical axis of the image pickup lens faces toward the front of the wearer, and captures an image of an actual workspace including the manipulator 10. Using the information of the virtual pressing force acting on the target workpiece and the site on which it acts, which are obtained as force control simulation results, the AR/VR image processing part 72 can execute augmented reality image processing, in which an image representing the virtual pressing force is overlaid on the actual image, or virtual reality image processing in which an image representing the virtual pressing force is overlaid on an image (video animation) in a virtual reality space in which a model of each object such as the manipulator 10 is arranged. The display 73 is arranged in front of the wearer and displays images (video) generated by the AR/VR image processing part 72. Note that the display device 70 has a position sensor (optical sensor, laser sensor, or magnetic sensor) and an acceleration sensor (gyro sensor) for acquiring the position of the display device 70 in the workspace, whereby the relative positional relationship of the coordinate system (camera coordinate system) fixed to the display device with respect to the world coordinate system fixed to the workspace can be understood.

Figure 5:
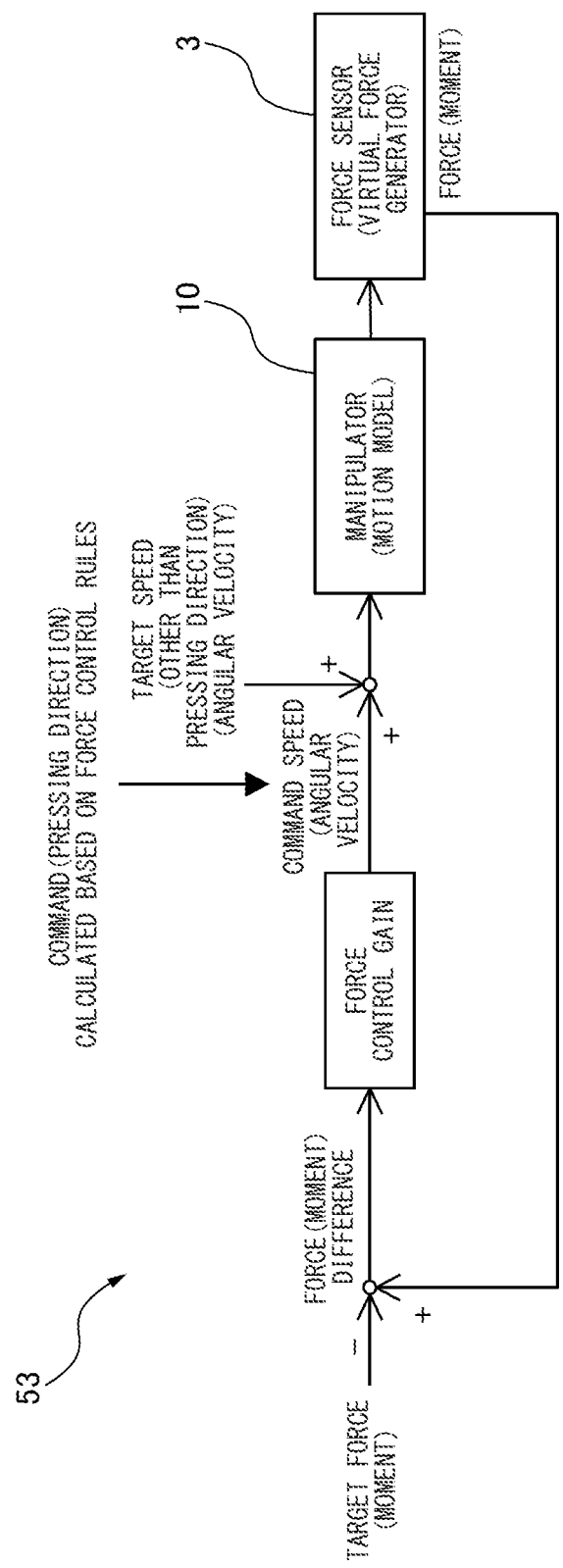
FIG. 5 is a block diagram of force control in a robot motion control part.

FIG. 5 is a block diagram of force control of the robot motion control part 53. In the present embodiment, the direction of "force control+position control" (the direction in which the workpiece is pressed by the tool) and the direction of only position control are separate, and the manipulator 10 is controlled by synthesizing the speed (angular velocity) command calculated for the direction in which "force control+position control" should be performed and the speed (angular velocity) command calculated for the direction in which only position control should be performed. Though omitted in FIG. 5 for convenience of explanation, the position control is performed based on the position control rule (for example, PD control) generally known in the technical field in which position sensors provided on respective axes of the manipulator 10 feed-back position detection values to control the position. In the force control shown in FIG. 5, the command speed (angular velocity) is calculated by multiplying the difference between the target force (force+moment) in the pressing direction and the force (moment) acting on the workpiece detected by the force sensor 3 by the force control parameter, which is referred to as force control gain. The force control gain represents the performance of the force control, and has the property that the larger the value, the faster the correction of the position/posture. The detection of the force (moment) and the calculation of the corresponding velocity (angular velocity) command amount are performed for each control cycle. Force control rules (calculation formula of velocity (angular velocity) command amount) in this case can be expressed as follows.

$$\Delta x = Kf(F-Fd)$$

where Kf: force control gain,

Fd: target force (force+moment, force: Fx, Fy, Fz, moment: Mx, My, Mz),

F: detected force, and $\Delta x$: target movement amount (speed) for each control cycle.

Next, the force control simulation executed under control by the controller 50 (force control simulation execution part 52) will be described. In the present embodiment, the force control simulation is realized by detecting or generating the virtual pressing force acting on the target workpiece when the motion program is executed by the methods described below (Virtual force generation method 1): The motion model (equation of motion) of the robot manipulator 10 is set, and the operation of the block diagram of the force control shown in FIG. 5 is executed by physics simulation. The virtual pressing force acting on the target workpiece is determined by a calculation model based on the position of the tool tip obtained by the physics simulation. Specifically, in the case of the virtual force generation method 1, a motion model is set for the manipulator 10, as shown in FIG. 5, and the virtual pressing force is calculated by the virtual force generator 54. In other words, the virtual force generator 54 functions as a force sensor in the force control simulation.

(Virtual force generation method 2): The virtual force (virtual pressing force) is obtained using log data including the force (moment) detected by force sensor 3 and the position information of the robot (manipulator 10) when the operation by force control has been executed in the past in the same operating environment or using log data obtained by detecting and recording the force (moment) acting on the workpiece by the force sensor by stopping the driving of the tool (for example, the rotational driving of the polishing grindstone) while actually moving the robot with respect to the target workpiece using the motion program. In the case of the virtual force generation method 2, the distance between the tool and the target workpiece can be determined from the teaching trajectory, and when there is log data of the same degree in terms of the distance between the motion trajectory of the robot and the target workpiece, the pressing force recorded as log data can be used as the virtual force (virtual pressing force).

(Virtual force generation method 3): In the actual operation related to a specific workpiece, training data representing the correspondence between the relative position or speed of the robot (tool) and the workpiece and the force (moment) detected by the force sensor is collected, and a learning model is constructed by the learning function to obtain the virtual force (virtual pressing force).

Virtual force generation method 1 will be described in detail. In virtual force generation method 1, the equation of motion (motion model) of the robot manipulator 10 is set, the force control blocks shown in FIG. 5 are operated by physical (numerical) simulation, and the position of the robot manipulator 10 (the position of the tip of the tool) is determined. The equation of motion of the robot manipulator 10 is generally expressed by the following mathematical formula.

$$M(\theta,\ddot{\theta}) + h(\theta,\dot{\theta}) + g(\theta) = \tau + \tau_L$$

In the above formula, $\theta$ represents the angle of each joint, M is a matrix related to the moment of inertia, h is a matrix related to the Coriolis force and centrifugal force, g is a term representing the influence of gravity, $\tau$ is torque, and $\tau L$ is load torque.

The motion command based on the teaching trajectory (command given to the manipulator 10 in the example of FIG. 5) is input into the equation of motion as input data to calculate the behavior of the robot (position of the tip of the tool). Based on the tool tip position calculated based on the above equation of motion, the virtual force (virtual pressing force) F received from the workpiece when the tool tip position contacts the target workpiece is determined. Examples of the calculation of the virtual force F are shown below.

The first calculation example of the virtual pressing force F is an example in which the rigidity of the target workpiece is relatively low with respect to the tool. In the present example, the amount by which the tool tip position moves beyond the contact position with the target workpiece to the target workpiece side is defined as $\delta$, and the virtual force F may be determined from the following formula:

$$F = Kd \cdot \delta \tag{1a}$$

by multiplying by coefficient Kd regarding the rigidity of the workpiece. Note that in this case, it is assumed that the target workpiece has a fixed position in the workspace. Alternatively, there may be used a procedure in which the force F received from the workpiece when the position of the tool tip contacts the target workpiece is calculated from the following formula:

$$F = Kd \cdot \delta + Kc \cdot Vc \tag{1b}$$

wherein Vc represents the velocity when the tool tip position moves beyond the contact position with the target workpiece. The coefficients Kd and Kc can be set in accordance with the rigidity and shape of the target workpiece.

The second calculation example of the virtual pressing force F is an example in which the virtual force F is calculated based on the amount of deflection of the tool when the rigidity of the tool is relatively low with respect to the target workpiece. The amount $\delta$ that the tool tip position moves beyond the contact position with the target workpiece to the target workpiece side is considered as the amount of deflection of the tool, and the virtual force F is calculated by the following formula using the rigidity coefficient (virtual spring constant) of the tool.

$$F = (\text{tool virtual spring constant}) \times \delta \tag{2a}$$

Note that if the tool is a so-called floating tool which has a mechanism (spring mechanism) that expands and contracts in the pressing direction, the expansion and contraction length of the tool tip can be obtained based on the position of the tool tip and the position of the target workpiece, and the virtual force F can be obtained by the following formula.

$$F = (\text{tool spring constant}) \times \text{expansion/contraction length} \tag{2b}$$

The third calculation example of the virtual force (virtual pressing force) F is an example in which the virtual force F is calculated from the distance that the robot (tool tip) moves in the pressing direction in response to the speed command when the rigidity of the tool is relatively high. In the case of this example, the movement position according to the speed command is defined as Tx, the position to which the robot (tool tip) actually moves in response to the speed command is defined as d, and calculation is performed by the following formula.

$$F = k \times (Tx - d) \tag{3}$$

where k is a coefficient. A value obtained as an experimental value, an empirical value, or the like may be set as the coefficient k.

In the calculation formula of the virtual force F described above, the virtual force may be obtained by substituting teaching data (teaching position, teaching speed) instead of the position and speed of the tool tip by physics simulation.

Next, the virtual force generation method 3 will be described in detail. The generation of the virtual pressing force by the virtual force generation method 3 is executed by the virtual force learning part 55. The virtual force learning part 55 has functions to extract useful rules, knowledge representations, judgment criteria, etc., in the set of input data by analysis, output the judgment results, and perform knowledge learning (machine learning). There are various methods of machine learning, but they can be broadly divided into, for example, "supervised learning", "unsupervised learning", and "reinforcement learning." Furthermore, in order to realize these methods, there is a method called "deep learning" in which the extraction of feature amounts themselves are learned. In the present embodiment, "supervised learning" is adopted as the machine learning by the virtual force learning part 55.

As described in the section "Virtual force generation method 2" above, in a state in which the tip of the tool and the target workpiece are in contact, it is considered that the relative distance between the tool tip position and the workpiece, the relative velocity, the coefficient related to the rigidity or dynamic friction of the target workpiece, the coefficient related to the rigidity of the tool, etc., correlate with the magnitude of the pressing force. Thus, the virtual force learning part 55 executes learning using learning data in which these values which correlate with the magnitude of the pressing force are used as input data and the pressing force detected by the force sensor is used as response data.

As a specific example of building a learning model, there may be an example of constructing a learning model corresponding to the first to third calculation examples of the virtual force F described above. When constructing a learning model corresponding to the first calculation example of the virtual force F, learning data in which the relative distance (δ) between the tool tip position and the target workpiece, relative velocity (Vc), and values related to the rigidity of the target workpiece (Kd, Kc) (or alternatively, at least the relative distance (δ) between the tool tip position and the target workpiece and the value related to the rigidity of the workpiece (Kd)) are used as the input data and the pressing force detected by the force sensor in that case is used as the response data is collected. The learning model is constructed by executing learning using the learning data.

When constructing a learning model corresponding to the second calculation example of the virtual force F, learning data in which the amount of movement of the tool tip position (δ) and the "virtual spring constant of the tool" are used as input data and the pressing force detected by the force sensor is the response data is collected. The learning model is constructed by executing learning using the learning data. Note that learning data (training data) composed of input data including at least one of the coefficient related to the rigidity of the target workpiece and the coefficient related to the rigidity of the tool part, and the distance (δ) of the tool part to the target workpiece when the tool part is in contact with the target workpiece and response data, which is the pressing force detected by the force sensor in that case, may be collected, and the learning model may be constructed by executing learning using the learning data.

When constructing a learning model corresponding to the third calculation example of the virtual force F, learning data in which the moving position (Tx) according to the speed command and the position (d) to which the tip of the tool actually moved in response to the speed command are used as input data and the pressing force detected by the force sensor in that case is used as the response data is collected. The learning model is constructed by executing learning using the learning data. The learning in this case corresponds to the operation of learning the coefficient k.

Such learning can be realized using a neural network (for example, a three-layer neural network). The operation modes of the neural network include a learning mode and a prediction mode. In the learning mode, the training data (input data) described above is input as an input variable to the neural network, and the weight applied to the input of each neuron is learned. Weight learning is executed by determining the error between the output value and the correct answer value (response data) when the input data is input to the neural network, and back-propagating the error to each layer of the neural network and adjusting the weight of each layer so that the output value approaches the correct answer value. When a learning model is constructed by such learning, it is possible to predict the virtual pressing force by inputting the input data described above as an input variable to the virtual force learning part 55. Specifically, the force control simulation execution part 52 inputs the input data described above to the virtual force learning part 5, which executes learning, and obtains the virtual force as the output therefrom.

The audio output part 74 outputs a sound which expresses the magnitude of the virtual force generated by the virtual force generator 54 in accordance with the volume. For example, the operator can more intuitively understand the magnitude of the virtual force by outputting a sound corresponding to the magnitude of the virtual force generated by the virtual force generator 54 in real time during the execution of the force control simulation.

Next, two examples including an exploration operation and a fitting operation will be described regarding the simulation of specific operations based on the function of the force control simulation by the controller 50 described above. When performing an exploration operation or a fitting operation, the hand 9 is attached to the tip of the wrist of the manipulator 10 to grip the fitting part, as shown in FIG. 3. This simulation is executed by the controller 50 (force control simulation execution part 52) using teaching data (motion program) by the operator, model data of each object such as the manipulator, workpiece, etc., placement position information of each object in the workspace, etc. Note that below, for convenience of explanation, the tool model, workpiece model, etc., may simply be described as "tool", "workpiece", etc.

Figure 6:
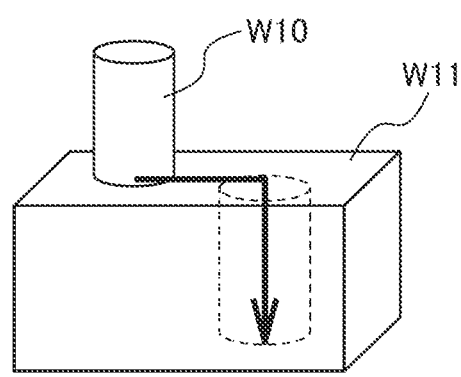
FIG. 6 is a view detailing an exploration operation.
Figure 7:
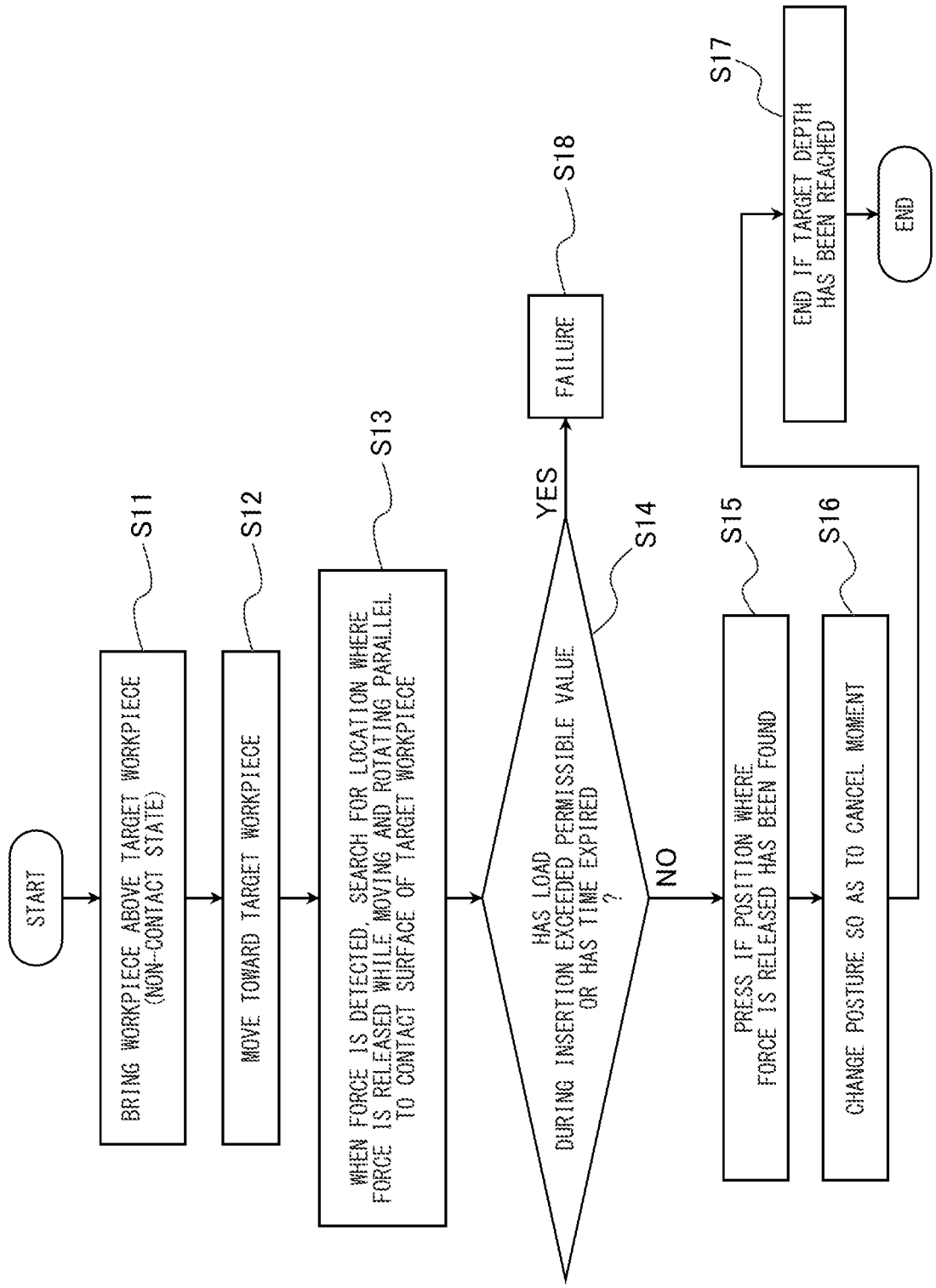
FIG. 7 is a flowchart showing a simulation operation of an exploration operation.
Figure 8A:
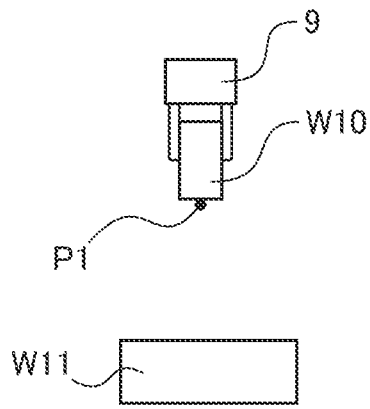
FIG. 8A is a view detailing the operation state of a tool part in an exploration operation or fitting operation.

As shown in FIG. 6, the exploration operation is for bringing a certain component (fitting component W10) into contact with another component (fitted part W11) to perform fitting while searching for a hole position. FIG. 7 is a flowchart showing a simulation operation of this operation by an exploration function. The simulation of the exploration operation of FIG. 7 is executed under the control of the CPU (force control simulation execution part 52) of the controller 50. First, the controller 50 brings the fitting component W10 to the teaching point P1 above the fitted component W11 as the target workpiece (step S11). FIG. 8A shows the positional relationship between the tool part 11 and the target workpiece W11 in step S11. As shown in FIG. 8A, the tip end portion of the fitting component W10 is positioned at the teaching point P1. In the step of FIG. 8A, the force detected by the virtual force generator 54 (virtual force sensor) is only the weight of the tool part 11 (hand 9 and fitting component W10).

Figure 8B:
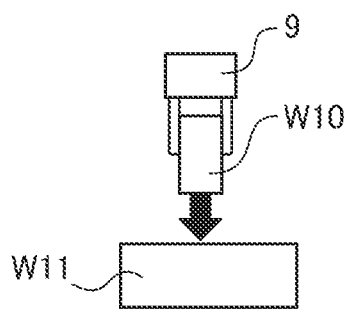
FIG. 8B is a view detailing the operation state of a tool part in an exploration operation or fitting operation.

Next, the controller 50 moves the tool part 11 toward the target workpiece (fitted component W11) at the teaching speed (step S12). FIG. 8B shows the state at this time. In this step, the virtual force generator 54 detects the inertial force generated in the direction opposite to the movement direction in accordance with the movement amount of the tool part 11 in the movement direction.

Figure 8C:
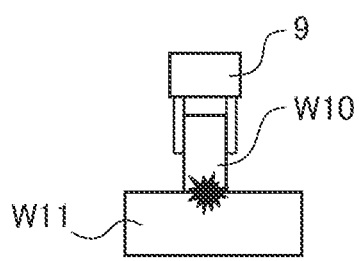
FIG. 8C is a view detailing the operation state of a tool part in an exploration operation or fitting operation.
Figure 8D:
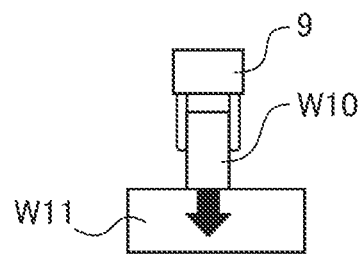
FIG. 8D is a view detailing the operation state of a tool part in an exploration operation or fitting operation

Next, the controller 50 detects the impact force due to the fitting component W10 colliding with the fitted component W11, which is the target workpiece, based on position/velocity information of the tool part 11 and position information of the fitted component W11. When the controller 50 detects the impact force due to the collision, the controller 50 controls the force along the direction of the target pressing force, and searches for a position where the force received from the target workpiece is released while moving the fitted component W10 in parallel and rotationally with respect to the contact plane of the fitted component W11 (step S13). In this case, when the search area on the fitted component W11 is specified as the force control parameter, the search can be executed according to this search area. FIGS. 8C and 8D show situations in which the fitting component W10 has collided with the target workpiece (fitted component W11) and is in a contact state. At the moment when the tool part 11 collides with the target workpiece (fitted component W11) (FIG. 8C), an impact force is exerted on the tool part 11. The virtual force generator 54 obtains the force generated when the tool part 11 collides with the target workpiece (fitted component W11) as follows. When the target workpiece is stopped, the velocity of the tool part 11 is v, the mass is m, and the impulse is completely preserved, whereby the following impulse formulas hold.

(a1) When it is assumed that a constant force is generated per unit time:

$$mv = F \cdot \Delta t$$

where $\Delta t$ is time and F is the generated force.

(a2) When the generated force is treated as an impulse force (when it is assumed that the force f changes with time):

$$mv = \text{(integral of } f(t)\text{)}.$$

(a3) When impulse loss occurs during the collision:

$$mv = e \cdot F \cdot \Delta t$$

where e is the coefficient of restitution.

The controller 50 (virtual force generator 54) obtains the generated force at the time of collision between the tool part 11 and the target workpiece (fitted component W11) by any of (a1) to (a3) above.

After collision between the tip of the tool part 11 and the target workpiece (fitted component W11) is detected, the tool part 11 and the target workpiece (fitted component W11) are in contact with each other, as shown in FIG. 8D. In the contact state, the controller 50 can obtain the virtual pressing force using any of the virtual force generation methods 1 to 3 described above. Here, it will be assumed that the virtual pressing force is obtained by the virtual force generation method 1.

As described above, when an impact force is detected, the controller 50 translates and rotates the tool part 11 (fitting component W10) on the surface of contact with the target workpiece (fitting component W11) while controlling the force in the target pressing force direction to search for a position where the force received by the tool part 11 from the target workpiece is released (specifically, a position where there is a hole) (step S13, FIG. 8D). In such a search, if the load exceeds the permissible value at the time of insertion into the portion considered to be a hole, or if the search time exceeds a predetermined threshold value (Yes in S14), it is considered that the search has failed and the process ends (step S18).

When the position where the force (virtual force) received from the target workpiece is released is found in the search, the controller 50 presses the fitting component W10 into the hole (step S15). When the fitting component W10 is pressed into the hole, if the fitting component W10 receives a moment from the inner wall of the hole, the posture of the fitting component W10 (tool part 11) is corrected so as to cancel the moment (step S16). For example, when the center line of the fitting component W10 is inclined with respect to the center axis of the fitting hole of the fitted component W11, a moment about the axis perpendicular to the fitting direction may occur. Based on the contact position between the fitting component W10 (tool part 11) and the fitted component W11, for example, the virtual force generated at the contact point between the fitting component W10 (tool part 11) and the fitted component W11 can be obtained using the virtual force generation method 1 described above. Based on this virtual force, the moment about a predetermined point (axis) on the fitting component W10 can be obtained. When obtaining the moment, for example, when a part of the fitting component W10 hits the inner peripheral surface of the hole of the fitted component W11, the moment acting on the fitting component W may be obtained assuming that the force acts in the normal direction of the contact surface on the inner peripheral surface of the hole. When the pressing amount into the hole reaches the target depth, the controller 50 ends the search operation (step S17).

Figure 9:
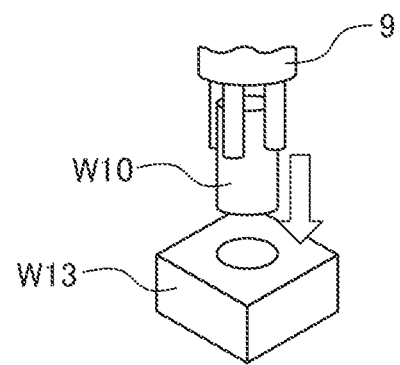
FIG. 9 is a view detailing a fitting operation.
Figure 10:
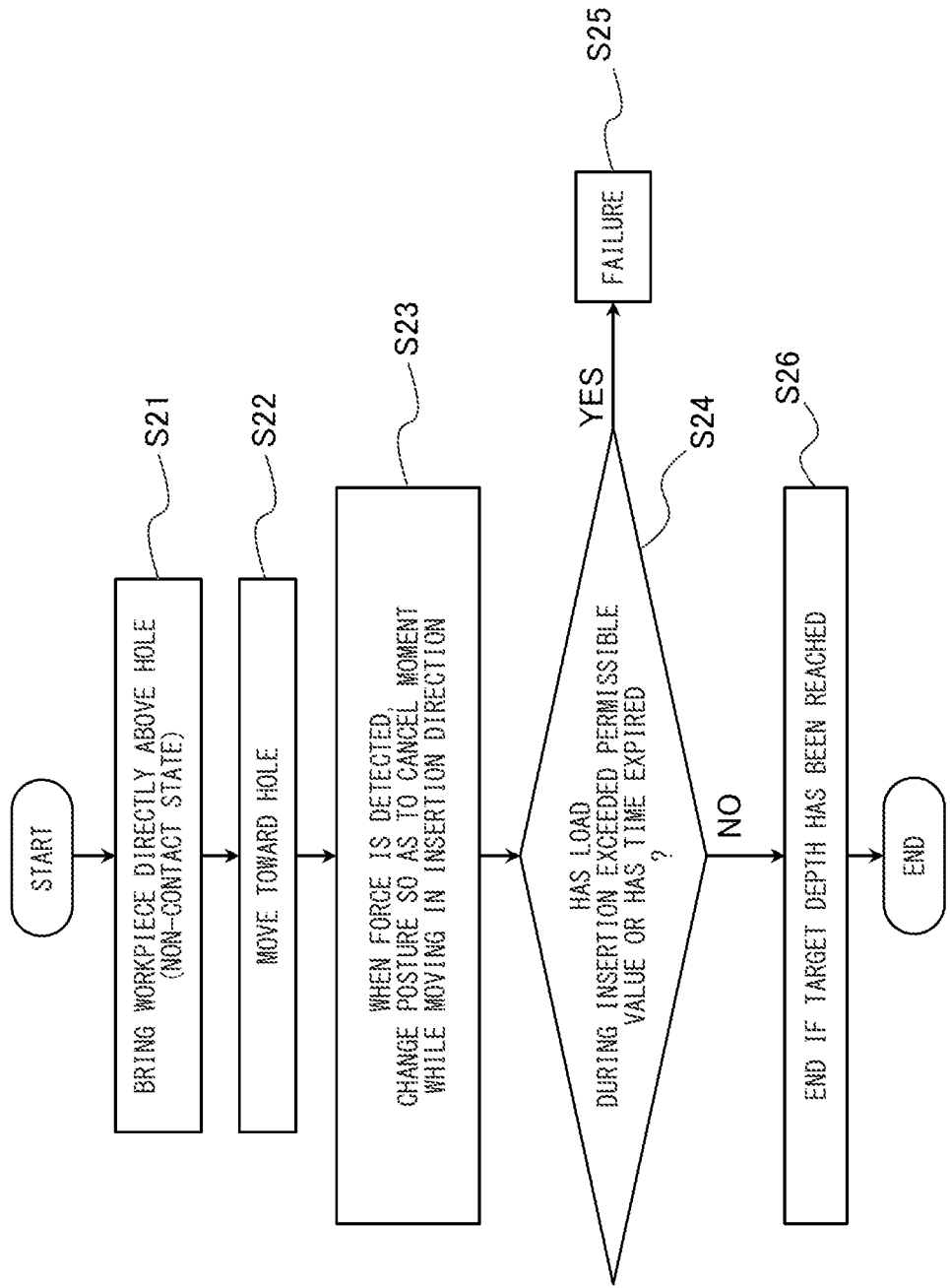
FIG. 10 is a flowchart showing a simulation operation of a fitting operation.

Next, simulation of a fitting operation will be described. As shown in FIG. 9, the fitting operation is for inserting one component (fitting component W10) into a hole of another component (fitted component W13). FIG. 10 is a flowchart showing a simulation operation of a fitting operation. First, the controller 10 brings the tip of the tool part 11 (specifically, the fitting component W10) directly above the hole (teaching point) of the target workpiece (fitted component W13) (step S21). Next, the controller 50 moves the fitting component W10 toward the hole (step S22). The force detected by the virtual force generator 54 in steps S21 and S22 is the same as in the case described above with reference to FIGS. 8A to 8D.

Next, when a force received when the fitting component W10 is inserted into the hole of the fitted component W13 is detected, the controller 50 continues the insertion while moving the fitting component W10 in the insertion direction and correcting the posture of the fitting component W10 so as to cancel the moment when the fitting component W10 receives a moment from the inner surface of the hole (step S23). The force received by the virtual force generator (force received in the direction opposite to the insertion direction) during insertion into the hole may be calculated based on the outer shape of the fitting component W10, the inner diameter of the hole on the fitted component W13 side, the friction coefficient of the inner peripheral surface of the hole, etc. In such an insertion operation, when the load (virtual force) exceeds an allowable value or the operation time exceeds a predetermined threshold value (Yes in S24), it is considered that the search has failed and the process ends (step S25). When the amount of movement in the insertion direction reaches the target depth, the controller 50 ends the fitting operation (step S26). In step S26, the fitting operation may be ended when the amount of movement in the insertion direction reaches the target depth and the pressing force (virtual pressing force) reaches the target pressing force.

Next, the virtual force display function by the controller 50 will be described. As described above, the controller 50 can generate the force (virtual force) received by the tool part 11 by executing the force control simulation. By providing the display device 70 with information including the virtual force, the occurrence site of the virtual force, and the position of the tool part as a result of the simulation, the controller 50 can display an image representing the magnitude of the virtual force and the occurrence site thereof as an augmented reality image overlaid on a real image of the workspace, or the image representing the magnitude and occurrence site of the virtual force overlaid on a displayed virtual reality image using model data of each object. When generating a virtual reality image, for example, the model data and the arrangement position information of each object in the workspace including the manipulator 10 can be provided from the controller 50 to the display device 70.

Generally, the teaching of operations by force control and the setting of force control parameters are difficult. By visualizing the occurrence site of the force and magnitude of the force related to the target workpiece and providing it as an augmented reality image or a virtual reality image, in the step before the operator who created the teaching data actually operates the robot to perform the force control operation, such as polishing, the operator can instantly understand the site where the force is acting on the target workpiece, etc., and can accurately correct the teaching point, the operation speed, and the force control parameter.

Figure 11:
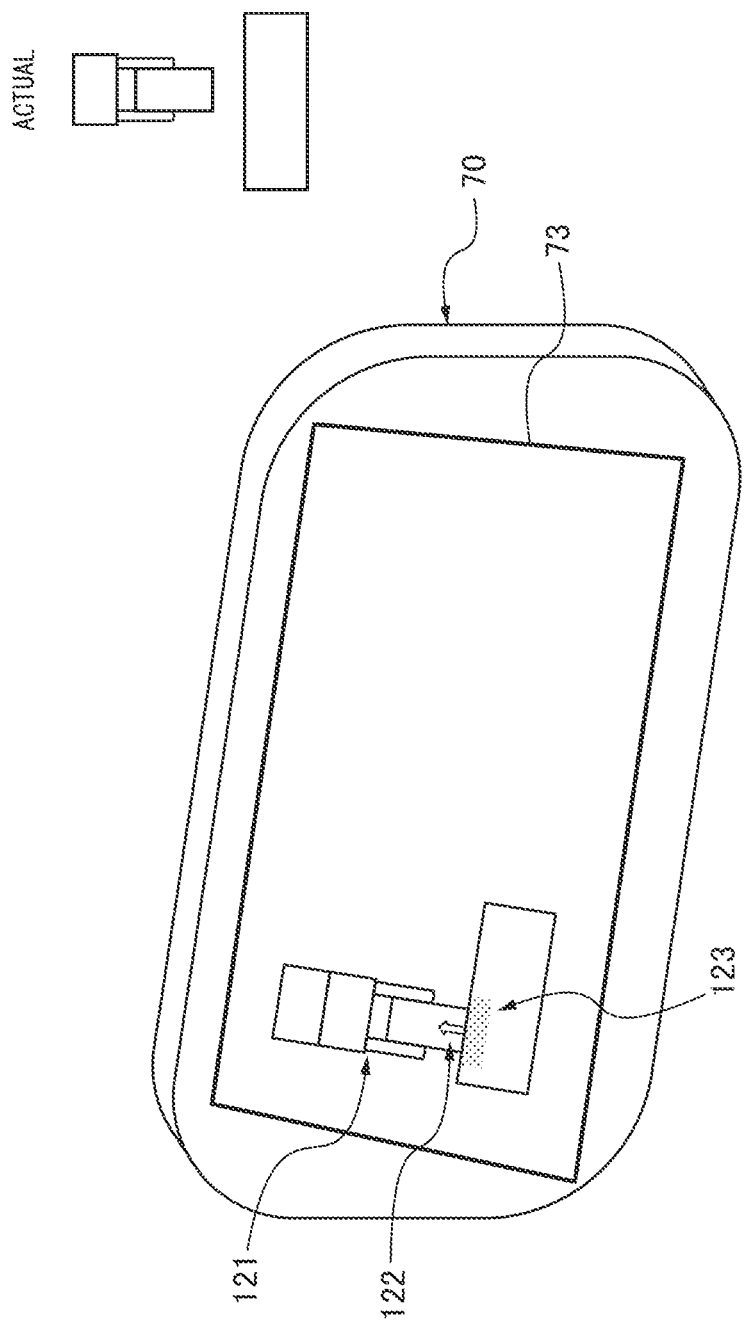
FIG. 11 is a view showing a virtual force display example.

FIG. 11 shows an example of the display of the virtual force. A situation in which the operator displays the result of the force control simulation as an augmented reality image on the display 73 of the display device 70 while performing the teaching work in the work space is illustrated. As shown in FIG. 11, the actual tool part is not in contact with the target workpiece, and the operator executes the force control simulation in accordance with the teaching point, the teaching speed, and the force control parameter taught and input by the operator. The controller 50 expresses a generation site 123 where the virtual force is generated when the tool part comes into contact with the target workpiece as an image, and expresses the magnitude of the virtual force by, for example, the size of arrow 122. The virtual force may be expressed by color coding according to the size, or may be displayed as a numerical value. Furthermore, the controller 50 superimposes and displays an image 121 representing the tool part in contact with the target workpiece as a result of the force control simulation on a real space image as, for example, a translucent image.

Figure 12:
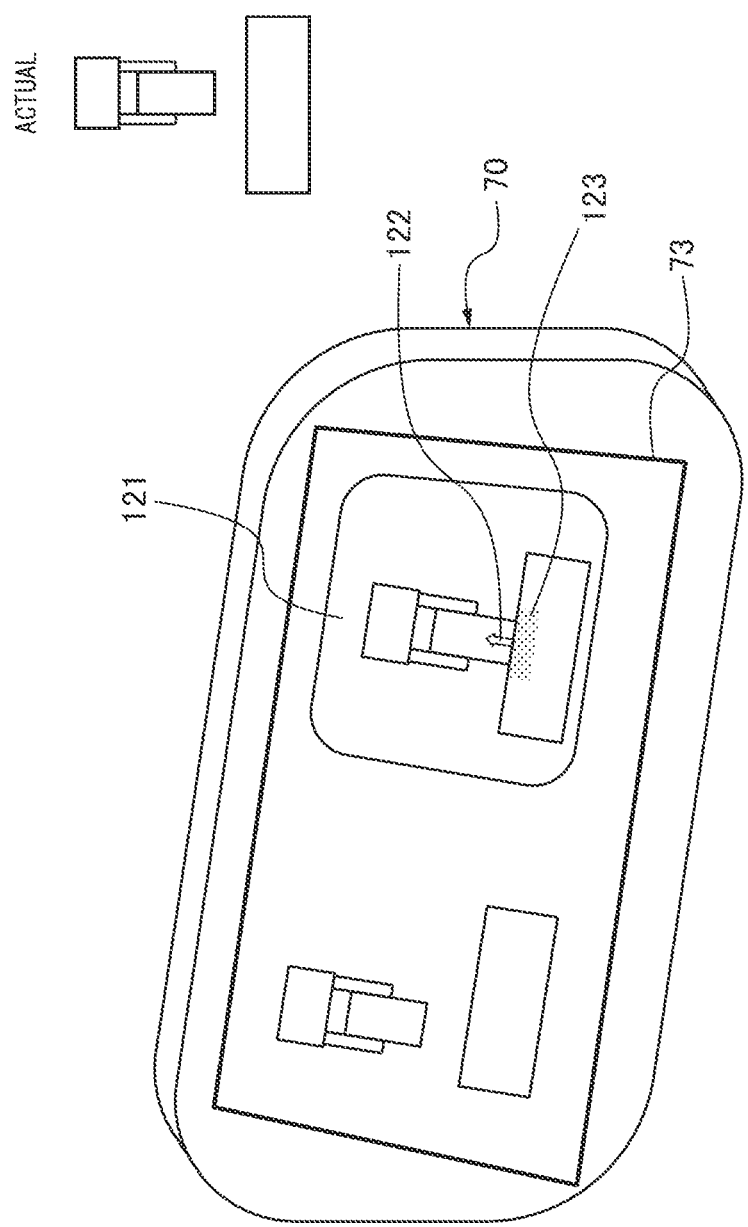
FIG. 12 is a view showing another virtual force display example.

FIG. 12 is an example in which an image 121 showing the tool part in contact with the target workpiece, an arrow 122 representing the magnitude of a force, and an image of the generation site 123 are arranged side by side with an actual image and displayed as an augmented reality image. For example, when the amount of information to be provided as an augmented reality image is large, it is considered that it may be convenient for the operator (wearer) to display the augmented reality image side by side as shown in FIG. 12.

Figure 13:
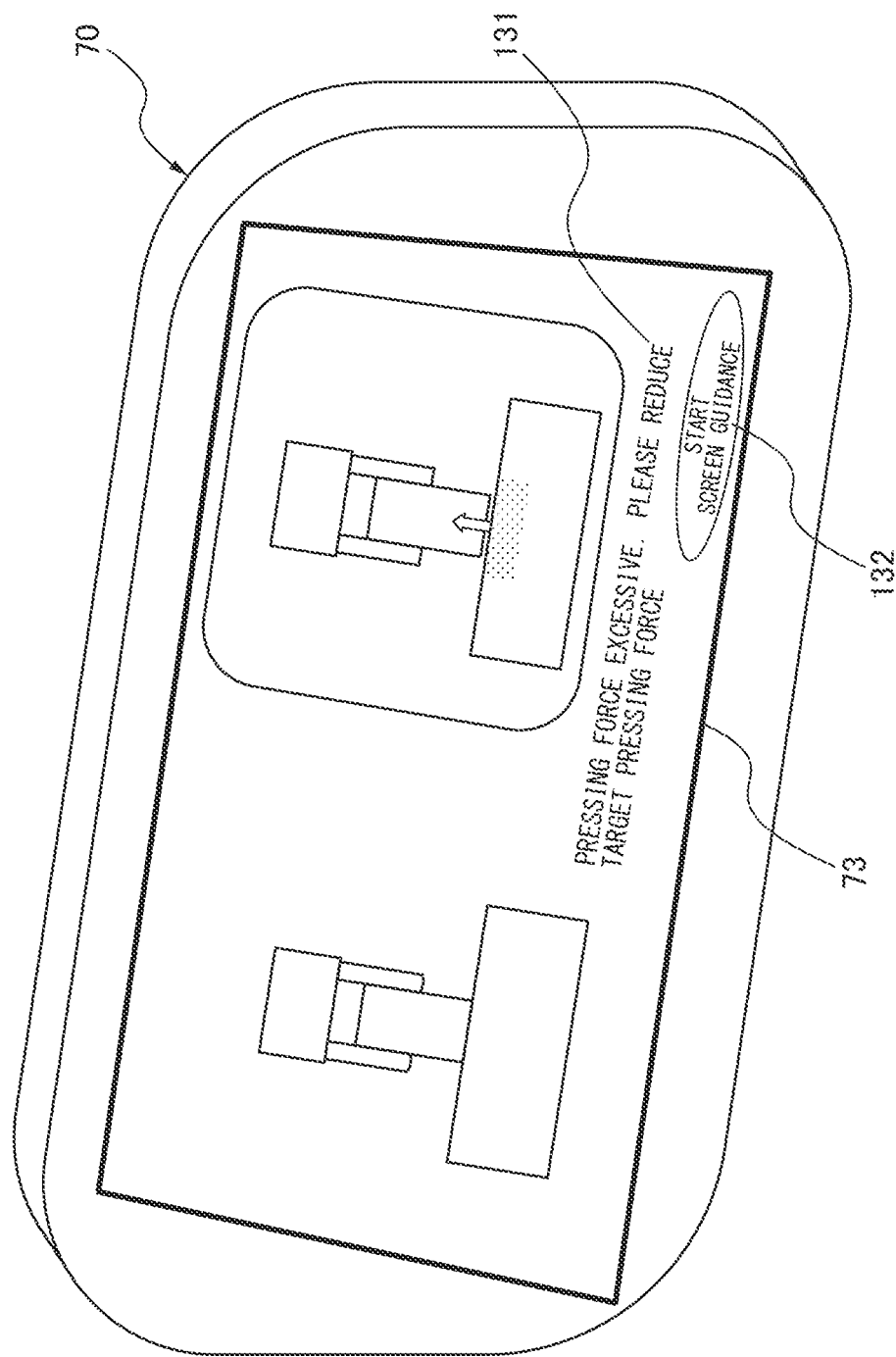
FIG. 13 shows a state in which a message image for advising parameter control adjustment is further displayed on the display screen of FIG. 12.
Figure 14:
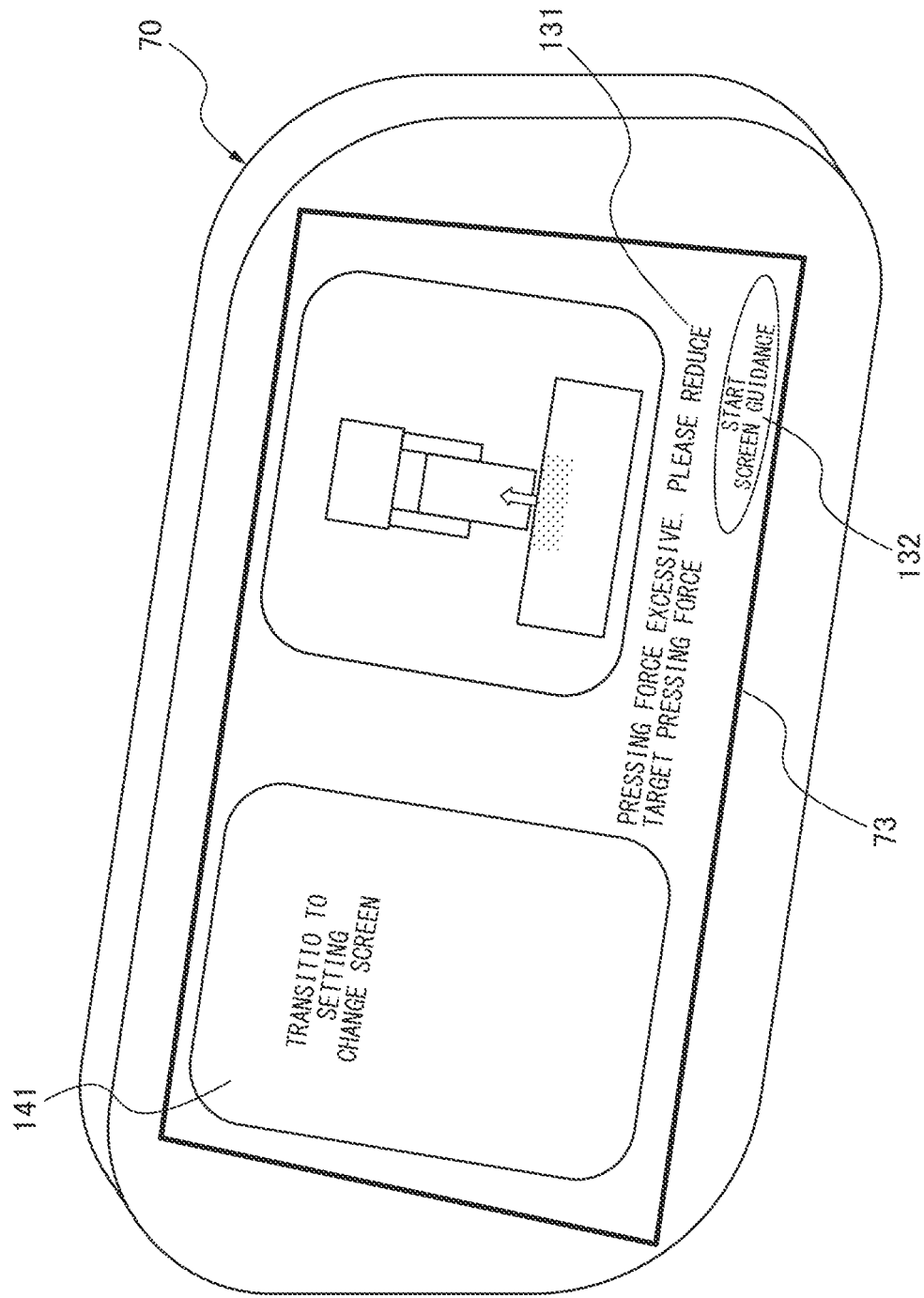
FIG. 14 shows a state in which an image for guiding a transition to a setting screen is further displayed on the display screen of FIG. 12.

The controller 50 may further comprise an adjustment content generation part 56 which generates an adjustment content regarding the control parameter for suppressing the virtual force within a predetermined reference value based on the results of comparing the virtual force with the predetermined reference value. FIG. 13 shows a state in which a message image 131 for advising to reduce the target pressing force is further displayed on the augmented reality image of the force control simulation result shown in FIG. 12. At this time, as shown in FIG. 14, the image 141 for guiding the transition to the target pressing force setting screen from the layered setting menu may be displayed on the left side of the screen. In addition to the adjustment details shown in FIG. 13, there may be an example in which advise is given to separate the teaching trajectory from the workpiece or reduce the operation speed when the pressing force is excessively strong, or to reduce the force control gain as adjustment contents.

Figure 15:
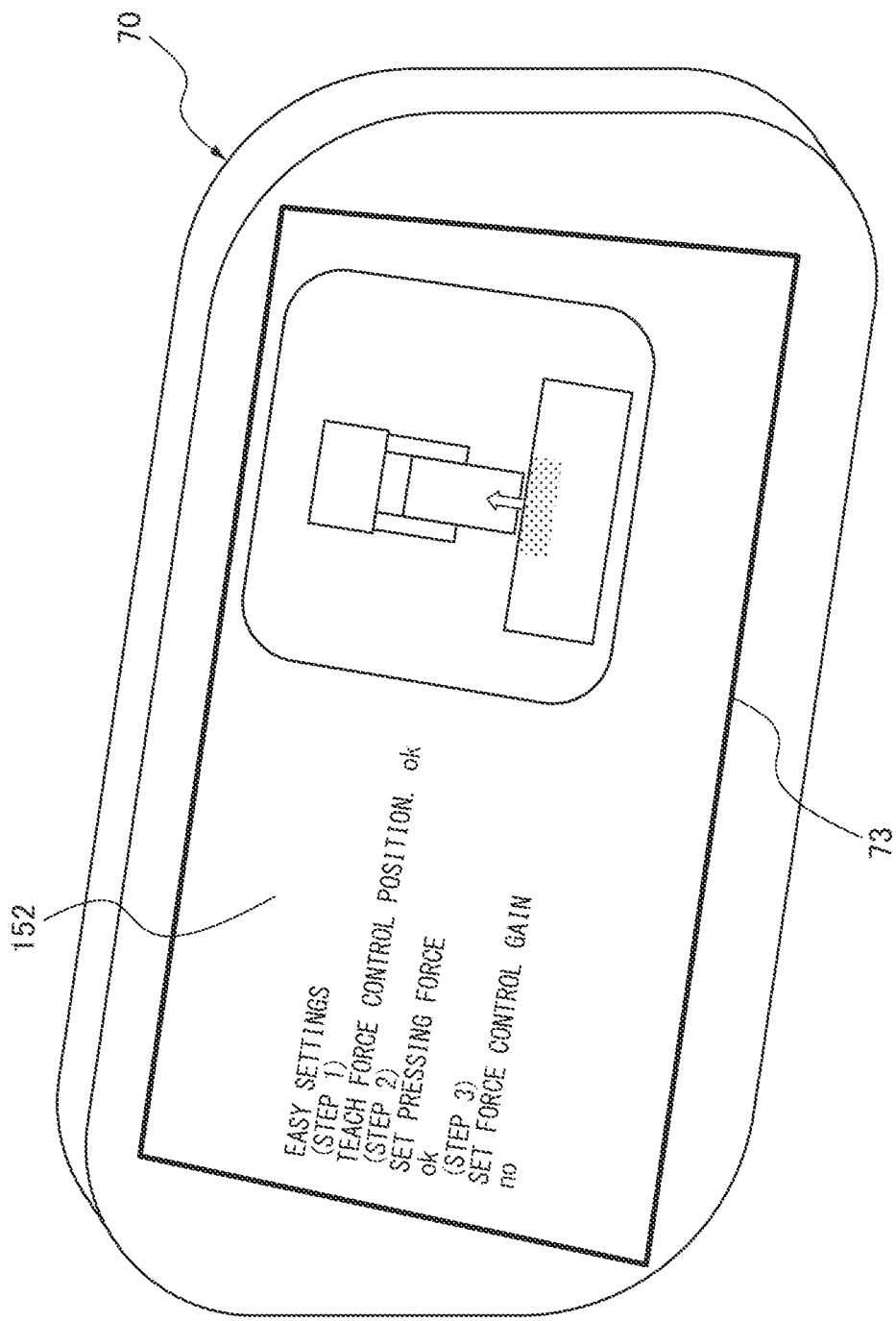
FIG. 15 is a view showing an example in which an interface image for guiding setting input of a force control parameter is displayed.

In the image of the force control simulation result shown in FIGS. 13 and 14, a selection icon 132 for transitioning to a screen for guiding the setting of the force control parameter is also displayed. In this state, when the operator selects the selection icon 132 with, for example, an operation device externally connected to the display device 70, an interface image 152 for guiding the setting input of the force control parameter is displayed on the left side of the screen (FIG. 15). The operator can adjust and input the force control parameters according to the interface image 152. In the example of FIG. 15, the operator can set or adjust the position (teaching point) of the force control, the target pressing force, and the force control gain in order along with the guidance. The presentation of such an interface screen is particularly useful for an operator who is unfamiliar with force control setting. After changing the settings of various parameters via such an interface screen, the force control simulation may be executed again and the result may be displayed on the interface screen.

According to the present embodiment as described above, the operator can intuitively understand the generation state of the pressing force, and it is possible to facilitate the parameter setting of the force control.

Though the present invention has been described above using typical embodiments, a person skilled in the art would appreciate that modifications and various other modifications, omissions, and additions can be made to each of the above embodiments without departing from the scope of the invention.

The division of functions in the controller 50, display device 70, and external computer 90 in the embodiments described above are exemplary, and the arrangement of these functional blocks can be changed. The imaging device may be arranged in a fixed position in the workspace as a separate device from the display device.

The functional blocks of the controller and display device may be realized by the CPU of the devices executing the various software stored in the storage device, or alternatively, may be realized by a hardware-based configuration such as an ASIC (Application Specific Integrated IC).

The program for executing the various simulation processes in the embodiments described above can be recorded on various recording media that can be read by a computer (for example, semiconductor memory such as ROM, EEPROM, or flash memory, magnetic recording medium, or an optical disc such as a CD-ROM or DVD-ROM).

REFERENCE SIGNS LIST 3 force sensor
10 robot manipulator
11 tool part
50 controller
51 memory
52 force control simulation execution part
53 robot motion control part
54 virtual force generator
55 virtual force learning part
70 display device
71 imaging device
72 AR/VR image processing part
73 display
74 audio output part
90 external computer
91 physics simulation part
100 robot system

The invention claimed is:

1. A robot simulation device for simulating a force control operation which is performed while bringing a tool part mounted on a robot manipulator into contact with a target workpiece, the robot simulation device comprising:
a memory which stores a motion program and a force control parameter, which is a set parameter related to the force control operation; and
a processor configured to execute a simulation of the force control operation based on the motion program and the force control parameter, wherein
the processor is also configured to generate, based on position information of the tool part obtained from results of the simulation of the force control operation, a virtual force received by the tool part from the target workpiece in a state in which the tool part is in contact with the target workpiece, and execute the simulation of the force control operation based on the virtual force and a target force set as the force control parameter, and
the processor is further configured to determine the virtual force based on the position information of the tool part and any of a coefficient-related to rigidity of the target workpiece, a coefficient-related to rigidity of the tool part, and a spring constant of the tool part.

2. The robot simulation device according to claim 1, the processor further configured to:
execute, using an equation of motion representing the robot manipulator, a physics simulation of motion of the robot manipulator based on the motion program and the force control parameter, and
determine the virtual force based on the position information of the tool part obtained by the physics simulation in a state in which the tool part is in contact with the target workpiece.

3. A robot simulation device for simulating a force control operation which is performed while bringing a tool part mounted on a robot manipulator into contact with a target workpiece, the robot simulation device comprising:
a memory which stores a motion program and a force control parameter, which is a set parameter related to the force control operation; and
a processor configured to execute a simulation of the force control operation based on the motion program and the force control parameter, wherein
the processor is also configured to generate, based on position information of the tool part obtained from results of the simulation of the force control operation, a virtual force received by the tool part from the target workpiece in a state in which the tool part is in contact with the target workpiece, and execute the simulation of the force control operation based on the virtual force and a target force set as the force control parameter, and
the processor is further configured to:
execute machine learning based on training data composed of input data including at least one of a coefficient related to rigidity of the target workpiece and a coefficient related to rigidity of the tool part, as well a distance of the tool part to the target workpiece in a state in which the tool part is in contact with the target workpiece, and response data, which is an actual pressing force corresponding to the input data, and
obtain the virtual force using a learning model constructed by the machine learning.

4. The robot simulation device according to claim 1, further comprising:
an imaging device which captures an image of an actual workspace including the robot manipulator and the target workpiece; and
a display which overlays an image representing a magnitude of the virtual force and a location of occurrence of the virtual force on the target workpiece on the image of the workspace as an augmented reality image.

5. The robot simulation device according to claim 1, wherein the memory further stores model data representing shapes of the robot manipulator, the tool part and the target workpiece and information on arrangement positions of the robot manipulator, the tool part and the target workpiece, and
the robot simulation device further comprises a display which overlays and displays an image representing a magnitude of the virtual force and a location of occurrence of the virtual force on the target workpiece on a virtual reality image arranged in a virtual workspace including the tool part and the target workpiece using the model data and the information on the arrangement positions.

6. The robot simulation device according to claim 4, the processor further configured to:
generate an adjustment content for the force control parameter for restraining the virtual force to within a predetermined reference value based on results of comparing the virtual force with the predetermined reference value, and
overlay and display an image representing the adjustment content on the image of the workspace or the virtual reality image.

7. The robot simulation device according to claim 1, the processor further configured to output a sound which expresses a magnitude of the virtual force by volume.

8. The robot simulation device according to claim 1, wherein the force control operation is an exploration operation, a fitting operation, or a profiling operation.

* * * * *